United States Patent
St. Pierre et al.

(10) Patent No.: US 7,881,206 B2
(45) Date of Patent: Feb. 1, 2011

(54) METHOD AND APPARATUS FOR MESH ROUTING

(75) Inventors: Robert P. St. Pierre, San Jose, CA (US); Vipul Gupta, Los Altos, CA (US); Pradip S. De, Arlington, TX (US)

(73) Assignee: Oracle America, Inc., Redwood City, CA (US)

(*) Notice: Subject to any disclaimer, the term of this patent is extended or adjusted under 35 U.S.C. 154(b) by 265 days.

(21) Appl. No.: 11/967,416

(22) Filed: Dec. 31, 2007

(65) Prior Publication Data

US 2009/0168653 A1 Jul. 2, 2009

(51) Int. Cl.
*H04L 12/26* (2006.01)
*G06F 15/173* (2006.01)

(52) U.S. Cl. .................. 370/238; 370/229; 709/242

(58) Field of Classification Search .............. 370/238, 370/392, 229, 235; 709/238, 239, 240, 241
See application file for complete search history.

(56) References Cited

U.S. PATENT DOCUMENTS

| | | | | |
|---|---|---|---|---|
| 7,327,683 B2 * | 2/2008 | Ogier et al. | ............... | 370/236 |
| 7,512,074 B2 * | 3/2009 | Strutt et al. | ............... | 370/238 |
| 7,545,736 B2 * | 6/2009 | Dziong et al. | ............... | 370/217 |
| 7,577,108 B2 * | 8/2009 | Zhang et al. | ............... | 370/255 |
| 7,675,863 B2 * | 3/2010 | Werb et al. | ............... | 370/241 |
| 7,701,858 B2 * | 4/2010 | Werb et al. | ............... | 370/241 |
| 7,715,396 B2 * | 5/2010 | Castro et al. | ............... | 370/392 |
| 2003/0179718 A1 * | 9/2003 | Ebata et al. | ............... | 370/255 |
| 2005/0286419 A1 * | 12/2005 | Joshi et al. | ............... | 370/230 |
| 2006/0034233 A1 | 2/2006 | Strutt et al. | | |
| 2006/0215582 A1 * | 9/2006 | Castagnoli et al. | .......... | 370/254 |
| 2006/0268879 A1 * | 11/2006 | Xhafa et al. | ............... | 370/392 |
| 2007/0147255 A1 * | 6/2007 | Oyman | ............... | 370/238 |
| 2008/0232258 A1 * | 9/2008 | Larsson et al. | ............... | 370/238 |
| 2008/0298250 A1 * | 12/2008 | Larsson | ............... | 370/238 |
| 2009/0003214 A1 * | 1/2009 | Vaswani et al. | ............... | 370/236 |
| 2009/0003232 A1 * | 1/2009 | Vaswani et al. | ............... | 370/252 |
| 2009/0003356 A1 * | 1/2009 | Vaswani et al. | ............... | 370/400 |

(Continued)

OTHER PUBLICATIONS

C. Perkins, et al., "Internet RFC 3561: Ad hoc On-Demand Distance Vector (AODV) Routing," Nokia Research Center, Jul. 2003.

(Continued)

*Primary Examiner*—Chi H Pham
*Assistant Examiner*—Robert Lopata
(74) *Attorney, Agent, or Firm*—Robert C. Kowert; Meyertons, Hood, Kivlin, Kowert & Goetzel, P.C.

(57) ABSTRACT

Method and apparatus for optimizing mesh routing for stability and system lifetime maximization in networks, for example in wireless networks. A routing module may be instantiated in nodes on the network. The routing module may implement a link quality and node health aware routing protocol on the network that considers a combination of link quality and node health/residual lifetime metrics in the calculation of the desirability of nodes and links between nodes as parts of an overall route. A route selection metric for each route may be determined from routing cost metrics for the nodes on the route and the number of hops on the route. A node may then select a best route according to the determined route selection metrics for the routes.

17 Claims, 5 Drawing Sheets

U.S. PATENT DOCUMENTS

2009/0034418 A1* 2/2009 Flammer et al. ............ 370/238
2009/0129316 A1* 5/2009 Ramanathan et al. ....... 370/328
2009/0154359 A1* 6/2009 Strutt et al. ................. 370/238

OTHER PUBLICATIONS

Sridhar, K.N., Chan, M.C., "Stability and hop-count based approach for route computation in MANET," Proceedings of 14th International Conference on Computer Communications and Networks, 2005, pp. 25-31.

Dube, R.; Rais, C.D.; Kuang-Yeh Wang; Tripathi, S.K.; "Signal stability-based adaptive routing (SSA) for ad hoc mobilenetworks," IEEE Personal Communications, vol. 4, Issue 1, Feb. 1997 pp. 36-45.

* cited by examiner

Flood Route Requests

Unicast Route Reply back

METHOD AND APPARATUS FOR MESH ROUTING

BACKGROUND OF THE INVENTION

1. Field of the Invention

This invention relates to computer systems, and more particularly to mechanisms for determining and selecting among routes across nodes in a network.

2. Description of the Related Art

A common solution for mesh routing in Wireless Sensor Networks (WSNs) involves an Ad-Hoc On-Demand Distance Vector (AODV) based routing algorithm. FIGS. 1A and 1B illustrate prior art calculation of a route according to the AODV model. In the AODV model, routes are calculated based on the number of hops between the source and destination nodes. The resulting route is most commonly accepted to be that which includes the shortest number of hops between nodes. In FIG. 1A, in the AODV model, to find a route to a destination node D, a source node S floods the network with a route request. Each node that receives the route request forwards the route request to neighboring nodes that it knows about. When the destination node D receives the route requests from one or more nodes, the destination node D returns at least one route reply on the network. When the source node S receives two or more route replies, it selects a route based on the shortest route as determined by the number of hops, as illustrated in FIG. 1B. Thus, the route selection metric in AODV is the number of hops.

The AODV routing solution suffers from a number of problems in the WSN space. For example, paths with the shortest number of hops may result in traversing less stable links. Within a wireless network, the most direct route may involve radio communications over longer distances. With the variability of radio communications at longer distances, the result is that shortest path routes may fail often and thus may require a new route to be calculated frequently. As another example, nodes in a WSN often have finite power supplies, such as batteries, which may have effects on routing. For example, the frequency of route discovery and calculation may deplete power across all potential nodes in the path. In addition, the utility of the overall mesh network may be dependent on a small number of routing nodes. If a single node is totally depleted, it may render all or part of the mesh unreachable.

SUMMARY

Embodiments of a method and apparatus for optimizing mesh routing for stability and system lifetime maximization in networks, for example in Wireless Sensor Networks (WSNs) and other wireless networks, are described. In embodiments, a routing module instantiated in nodes (devices) on the network may implement a link quality and node health aware routing protocol on the network that considers a combination of link quality and node health/residual lifetime metrics in the calculation of the desirability of nodes and links between nodes as parts of an overall route. Embodiments may implement a routing algorithm that results in more stable routes than a simple "shortest number of hops" method such as AODV, and in addition may balance the distribution of traffic across nodes that are not energy-depleted, which may prolong the overall life and health of the network.

In some embodiments, the link quality may be derived from either the Link Quality Indicator (LQI) or the Radio Signal Strength Indicator (RSSI) of an 802.15.4 radio packet. For alternate underlying radio technologies, similar mechanisms may be used to determine the quality of a communication path to a remote node. Additionally, in calculating a path or route, embodiments may consider the health, for example the remaining expected lifetime, of a node in calculating a node health metric. This may be based, for example, on a node's expected remaining time of operation based on past work characteristics, routing load, and/or remaining battery (or other power source) life.

In one embodiment, a history depreciated normalized sum of the link quality over a time window may be used as a measure of link quality. In one embodiment, a normalized function of the residual node battery power may be used as a measure for the node health. In one embodiment, the current traffic through the node may be used as a measure of the node health. In one embodiment, both a normalized function of the residual node battery power and the current traffic through the node may be used to measure node health. Thus, the information passed along to other nodes by a node is not just a simple value of the link (e.g., the number of hops), but incorporates link quality information and node health information.

In one embodiment, a route request message may be propagated across routes on a network from a source node looking for a route to a destination node. At each node on each route, a routing cost metric for the node may be calculated according to link quality and node health metrics for the node. At each node on each route, the routing cost metric for the node may be incorporated into outgoing routing messages (e.g., route replies). A route selection metric for each route may be determined from the routing cost metrics for the nodes on the route and the number of hops on the route. In one embodiment, calculation of the route selection metrics for the routes may be performed at the source node upon receiving route replies that include the number of hops on the corresponding routes and the routing cost metrics for the nodes on the routes. In another embodiment, the route selection metrics for the routes may be calculated or adjusted at nodes along each route, rather than calculating the route selection metrics for all routes entirely at the source node. The source node may then select a best route according to the determined route selection metrics for the routes.

Figure 1A:
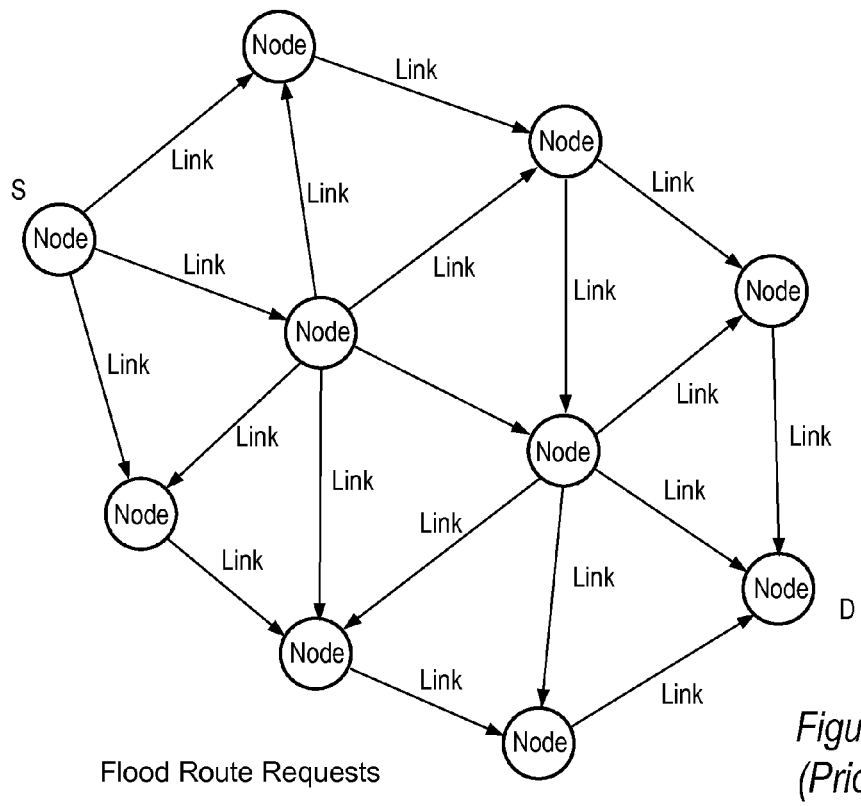
FIGS. 1A and 1B illustrate prior art calculation of a route according to the AODV model.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for optimizing mesh routing for stability and system lifetime maximization in networks, for example in Wireless Sensor Networks (WSNs) and in other wireless networks, are described. In embodiments, a routing module instantiated in nodes (devices) on the network may implement a link quality and node health aware routing protocol on the network that considers a combination of link quality and node health/residual lifetime metrics in the calculation of the desirability of nodes and links between nodes as parts of an overall route. Where simply augmenting existing routing algorithms, e.g. that used by AODV implementations, based on route stability may increase dependability of a given route, such an approach may also deplete critical nodes, diminishing the overall lifetime and utility of the sensor network. Embodiments of the routing module, by considering both link quality and node health, may improve reliability while protecting the network from overuse of critical nodes. Furthermore, the use of less optimal paths, in terms of number of hops, for at least some traffic may prolong the overall life of the network.

In some embodiments, the link quality may be derived from either the Link Quality Indicator (LQI) or the Radio Signal Strength Indicator (RSSI) of an 802.15.4 radio packet. For alternate underlying radio technologies, similar mechanisms may be used to determine the quality of a communication path to a remote node. Additionally, in calculating a path or route, embodiments of the routing module may consider the health, for example the remaining expected lifetime, of a node in calculating a node health metric. This may be based, for example, on a node's expected remaining time of operation which may be based on past work characteristics, routing load, and/or remaining battery (or other power source) life. In general, anything that may have an effect on overall node lifetime may be considered as a factor in calculating a node health metric in various embodiments. For example, energy consumption in computation, driving attached servos, or other node operations may be considered when calculating the expected remaining lifetime of a node. In one embodiment, regenerating power sources such as solar chargers to extend battery life may be considered when calculating the remaining expected lifetime of a node. As another example of a node characteristic that may be used in calculating a node health metric, some nodes on a network may crash, or become unavailable for some other reason, and reboot more often or for longer periods than other nodes; one embodiment may take into account the number of reboots and/or the amount of downtime of each node as indicator(s) of how likely the node is to be up and available to forward traffic on the network in calculating the node health metric.

In one embodiment, the calculation of a route selection metric for a route may be determined by the cumulative effect of the component path elements (nodes and links) across the entire route. In one embodiment, the routing algorithm that calculates the value of a given route may be tuned for weighting the result toward maximizing either route/link stability or quality or node health/route expected lifetime. The routing algorithm may be implemented in embodiments of the routing module.

Embodiments of the routing module may improve the reliability of mesh routing on networks such as WSNs. Packets on a route may be required to make additional hops, as selected routes may include more hops than other routes, but the number of packets that are not lost and retransmitted may improve the overall efficiency of the network. Embodiments of the routing module may implement a routing algorithm that results in more stable routes than a simple "shortest number of hops" method such as AODV, and in addition may balance the distribution of traffic across nodes that are not energy-depleted, which may prolong the overall life and health of the network.

Figure 1B:
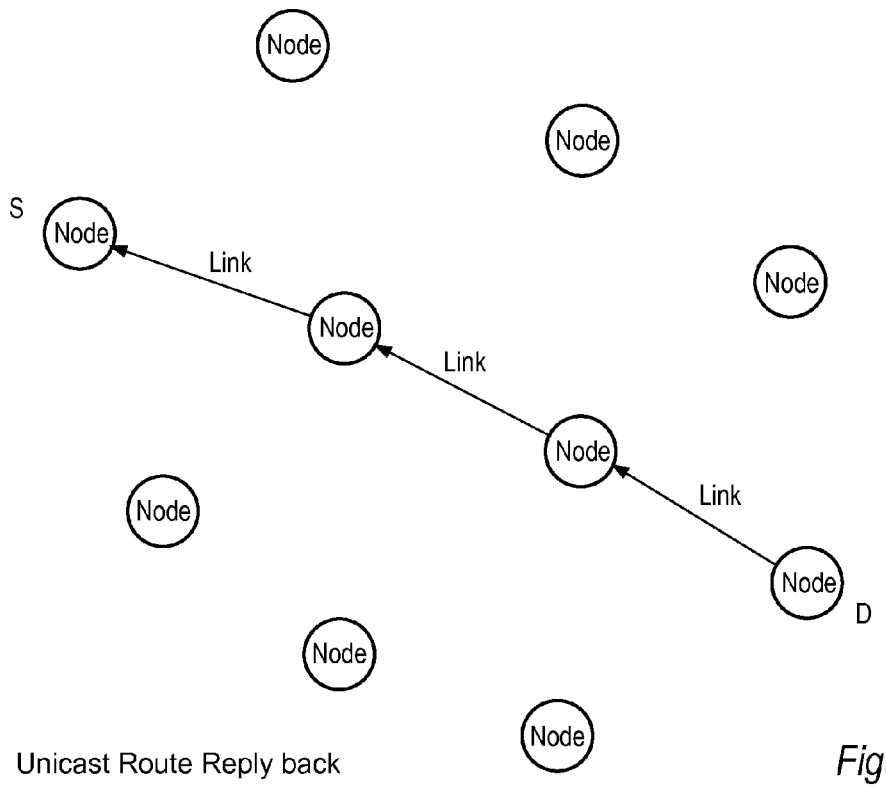

In the AODV model, as noted, the route selection metric is the number of hops. For example, in FIG. 1B, the selected route has three hops, so the routing cost metric for that route has a route selection metric of "3". The smaller the number, the better the route. A route with a route selection metric of 3 would be selected over another route with a route selection metric of 4, for example. One embodiment of a routing module that implements a link quality and node health aware routing protocol on the network, as described herein, may adjust the raw number of hops on a route in accordance with link quality and node health on the route, with poor link quality and/or node health on the route resulting in the route selection metric being adjusted upwards. Thus, on a route with three hops (and four nodes, with two nodes between the source and destination nodes) if one or both of the two nodes on the route between the source node and the destination node have poor link quality and/or poor node health, the route selection metric will be adjusted upwards, and may be adjusted to where it is higher than the route selection metric as determined for another route with more hops. Therefore, the source node may select a route that has more hops, but overall better link quality and node health, and thus a lower route selection metric. Note that, in some embodiments, other methods of calculating the route selection metric may be used that may result in a higher route selection metric representing a route that is preferred over routes with lower route selection metrics.

Figure 2A:
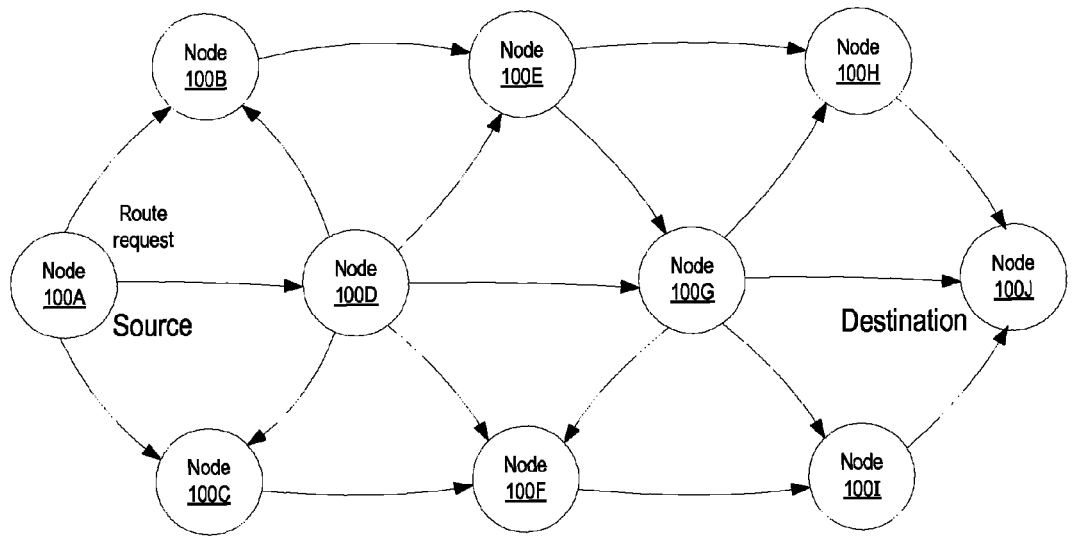
FIGS. 2A through 2C illustrate the calculation and selection of a route on a network by embodiments of a routing module that implements a link quality and node health aware routing protocol on the network.
Figure 2B:
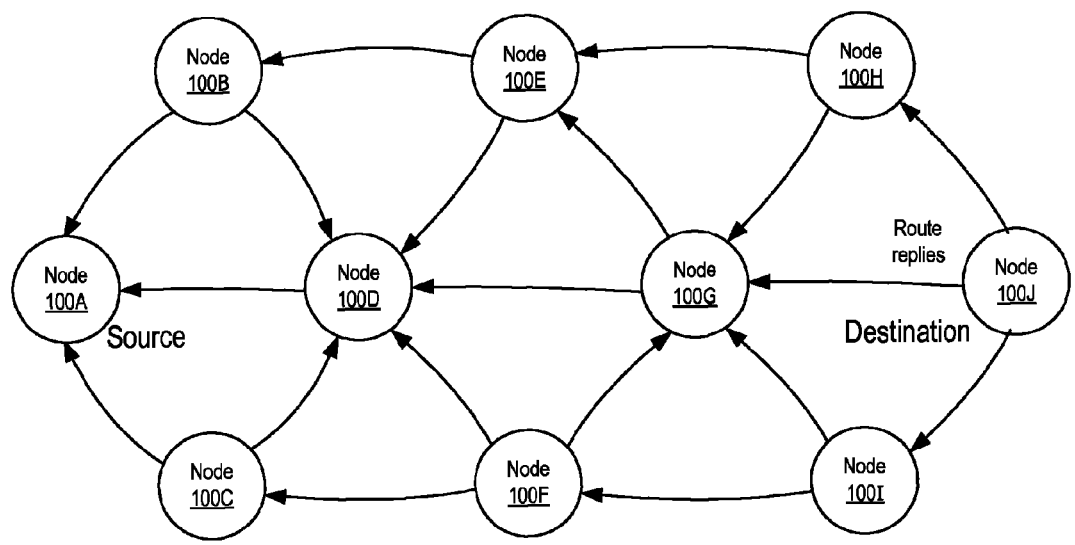
Figure 2C:
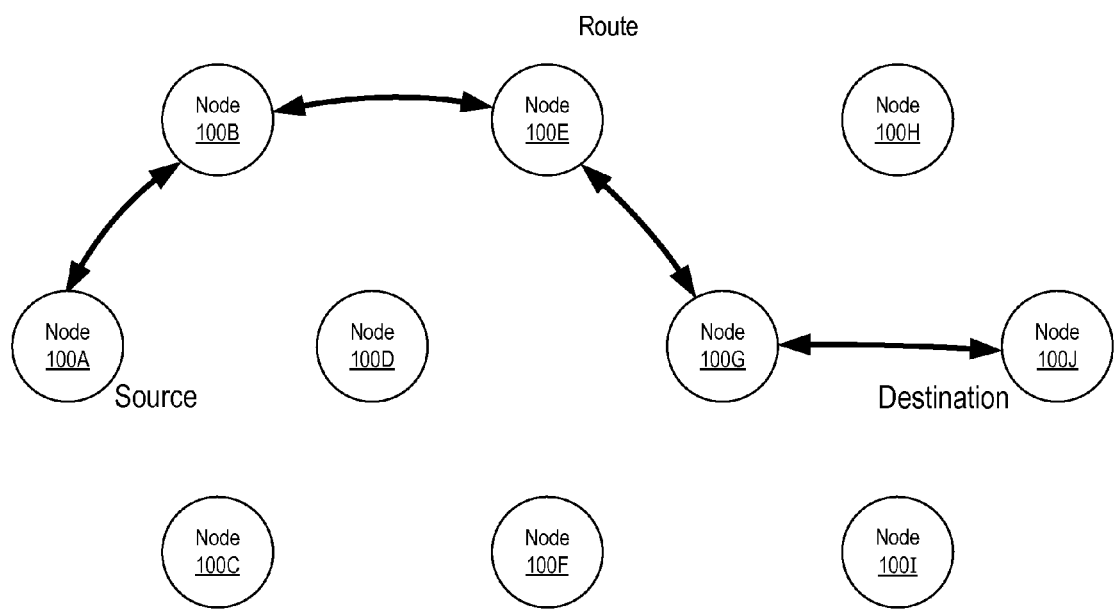

FIGS. 2A through 2C illustrate the calculation and selection of a route on a network by embodiments of a routing module that implements a link quality and node health aware routing protocol on the network. In embodiments, a best or preferred route may be determined or selected according to a route selection metric determined for each route and based on the number of hops on the route adjusted by one or more link quality and node health metrics that may be calculated at each node on the route. In one embodiment, the raw 'number of hops' metric for a route may be multiplied or otherwise adjusted by calculations of link quality and node health metrics at nodes on the route to generate a route selection metric for the route. An exemplary formulation of a method of calculating a routing cost metric C at each node is further described below.

Embodiments may be directed at wireless networks in general and Wireless Sensor Networks (WSNs) in particular, and thus nodes 100 each represent a wireless device of some type on the network. Particular embodiments directed at Wireless Sensor Networks (WSNs) that include wireless devices that implement support for IEEE 802.15.4 radio communications is described herein by way of example. Thus, each node 100 in these embodiments would include hardware/software support for IEEE 802.15.4 radio communications. However, embodiments of a routing module that implements a link quality and node health aware routing protocol as described herein may be used in devices that support other wired or wireless protocols, and in other types of networks including other wireless networks, wired networks, and combinations of wired and wireless networks.

In FIG. 2A, source node 100A floods the network with a route request. The route request is given a route request identifier so that nodes 100 can distinguish between route requests. The route request propagates along all routes, with each node 100 that receives the route request forwarding the route request to at least one of its known "neighbor" nodes. Eventually, copies of the route request reach destination node 100J via, in this example, three neighbor nodes 100. Thus, destination node 100J receives, in this example, at least three copies of the route request. In one embodiment, at each node 100 that is traversed on a route, link quality and node health may be calculated and applied to calculate a route selection metric in the particular route request. Alternatively, link quality and node health values may be added to the route request at each node 100 that is traversed on a route.

In FIG. 2B, in one embodiment, destination node 100J may respond to each received route request by sending a route reply to the node 100 from which the route request was received. In one embodiment, each route reply may include the route request identifier. In one embodiment, each route reply may further include an indication of the particular route. This indication may be indications of each node 100 that is traversed on the route. Each node 100 that receives a route reply may forward the route reply to at least one node from which it originally received the corresponding route request. In one embodiment, each node 100 that receives a route reply may forward the route reply to each node from which it originally received the corresponding route request. In one embodiment, at each node 100 that is traversed on a route, link quality and node health may be calculated and applied to calculate or adjust a route selection metric in the particular route reply. Alternatively, link quality and node health values may be added to the route reply at each node 100 that is traversed on a route. Eventually, route replies reach source node 100A via, in this example, three neighbor nodes 100. Thus, source node 100A receives, in this example, at least three copies of the route request. In practice, source node 100 receives a route reply representing each particular route that was traversed between destination node 100J and source node 100A. Each route reply includes a route selection metric calculated on that particular route, or alternatively data that can be used to calculate a route selection metric for that particular route. Source node 100A can then compare the route selection metrics of the routes to select a best route according to the route selection metric. In one embodiment, source node 100A may discard all other routes than the selected route. In another embodiment, source node 100A may store one or more of the other routes so that, if the selected route later fails or deteriorates, an alternate route may be selected without having to re-initiate the route determination process illustrated in FIGS. 2A and 2B.

FIG. 2C illustrates an exemplary route between source node 100A and destination node 100J that may be selected using the method as illustrated in FIGS. 2A and 2B and described above, according to embodiments of a routing module that implements a link quality and node health aware routing protocol on the network. The selected route traverses nodes 100B, 100E, and 100G, and includes four hops, which is not the minimum number of hops on this exemplary network, which would be three hops on the route traversing nodes 100D and 100G. So, in this example, either the node health of 100D, or the link quality between 100D and 100G and/or 100D and 100A, is poor, or both are poor, resulting in the route selection metric for routes through 100D being adjusted to the point where the other route, illustrated in the Figure, is preferable over the optimal route, based simply on the number of hops, through node 100D. Note, however, that embodiments of the routing module that implements a link quality and node health aware routing protocol on the network may result in selection of a route with a minimal number of hops if the link quality and node health on that route are sufficiently good.

Figure 3:
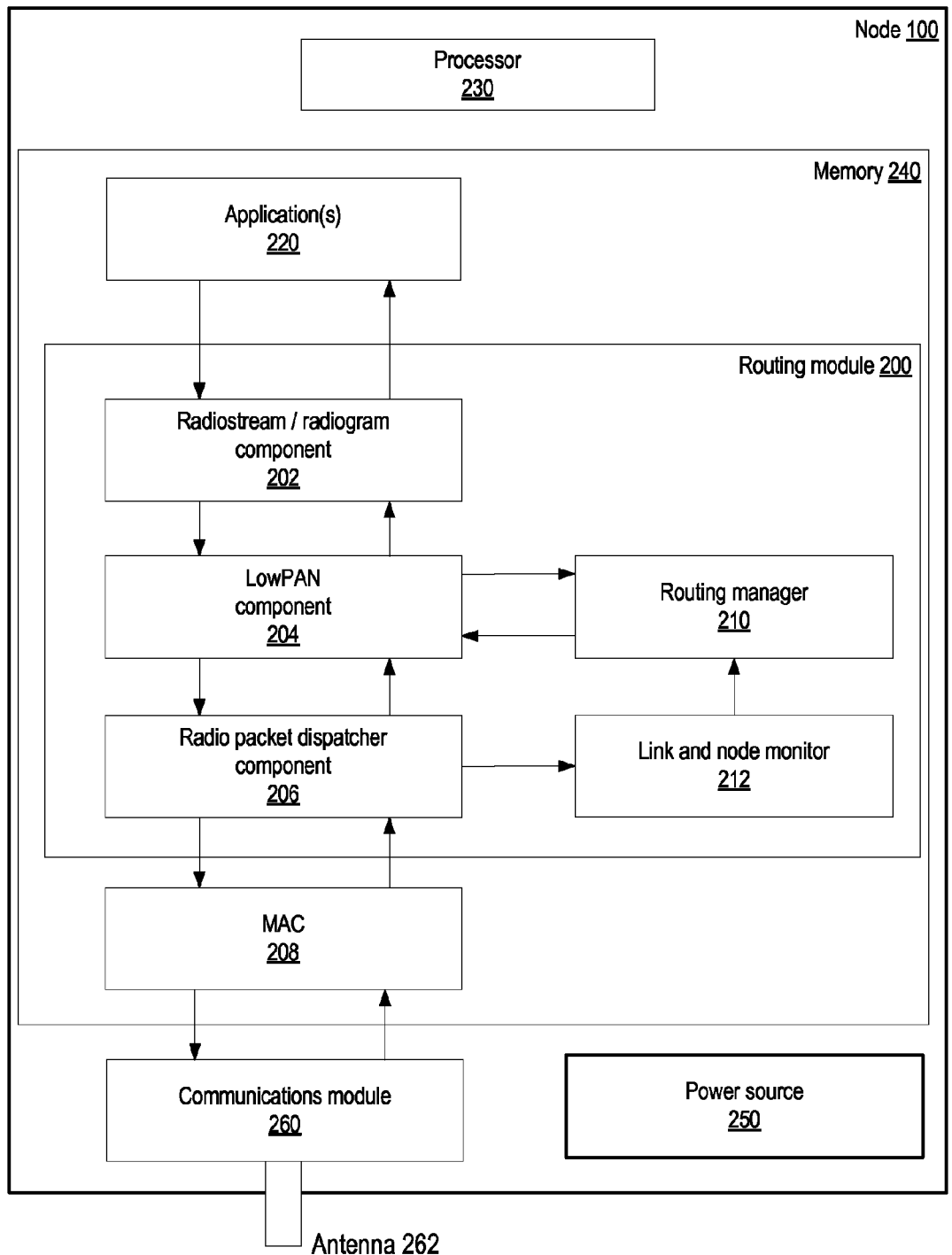
FIG. 3 illustrates an exemplary routing module in an exemplary node, according to one embodiment.

FIG. 3 illustrates an exemplary routing module in an exemplary node, according to one embodiment. The routing module may be implemented in some or all nodes 100 on a network, such as a Wireless Sensor Network (WSN). Node 100 may be a wireless device. Node 100 may include one or more processors 230, a memory 240, a power source 250, and a communications module 260 and antenna 262. Processor 230 may be any suitable processor capable of executing instructions. Memory 240 may be configured to store instructions and data accessible by processor 230. In various embodiments, memory 240 may be implemented using any suitable memory technology, such as static random access memory (SRAM), synchronous dynamic RAM (SDRAM), nonvolatile/Flash-type memory, or any other type of memory. Program instructions and data implementing desired functions, such as the methods and techniques described herein for a routing module that implements a link quality and node health aware routing protocol on the network, are shown stored within memory 240.

Power source 250 may be a battery or some other internal or external power source. In some devices, power source 250 may be a regenerating power source such as solar chargers to extend battery life. In some devices, power source 250 may be a limited power source with an expected lifetime that may be determined from a current level of the power source 250, for example a battery. Note that nodes in wireless networks such as WSNs often have finite power supplies, such as batteries, and thus commonly employ processors, memory, and other hardware components that require relatively low power consumption. Communications module 260 and antenna 262 may be configured to transmit and receive signals, for example signals according to the IEEE 802.15.4 standard, to and from other devices with similar communications capabilities.

Media Access Control (MAC) 208 is the basic software that drives the communications module 260. MAC 208 receives incoming packets from communications module 260 and passes the packets up into the link layer, which is represented in this example by radio packet dispatcher component 206. MAC 208 may also collect information such as the relative signal strength and link quality.

Routing module 200 may include several components. The exemplary routing module 200 in FIG. 3 includes radio packet dispatcher component 206, LowPAN component 204, Radiostream/radiogram component 202, link and node monitor 212, and routing manager 210. Other embodiments may implement routing module 200 differently, with one or more different components. However, any routing module will include one or more components that perform similar functions to those described for the exemplary embodiment in FIG. 3.

Radiostream/radiogram component 202 is the interface to what might be termed the "application layer." Radiostream/radiogram component 202 is what the user (e.g., application 220) sees for sending and receiving streams of data or datagrams. LowPAN component 204 handles the fragmentation and reassembly and routing of data packets. Radio packet dispatcher component 206 is the interface to MAC 208 and communications component 260.

Radio packet dispatcher component 206 takes a data payload out of a datagram received from MAC 208, puts it in one place in memory, and also handles retrieving and preserving information such as the relative signal strength, link quality, and other MAC layer metrics. LowPAN is an implementation of an Internet Engineering Task Force (IETF®) specification. LowPAN component 204 is an adaptation layer that puts higher-level protocols on top of radio packets to be transmitted, and that reconstructs datagrams from incoming radio packets. LowPAN component 204 handles the routing of packets and the fragmentation and reconstruction of datagrams. LowPAN component 204 enables the presentation of a larger datagram size than a single 128-byte IEEE 802.15.4 radio packet can handle. LowPAN component 204 handles the reassembly of packets, and the demultiplexing of multiple connections and/or multiple protocols that may be on top of the packets. Any process that needs to use the communications module 260 goes through LowPAN component 204. LowPAN component 204 responsibilities and capabilities may include framing, adaptation, header compression, address generation and a mechanism for ad hoc routing. In one embodiment, the mechanism for ad hoc routing may include "hooks" or interfaces in the LowPAN component 204 for implementing various route-related methods such as a method to find a route (e.g., FindRoute) and a method for invalidating a route (e.g., InvalidateRoute). Routing manager 210 may implement such methods to support the link quality and node health aware routing protocol described herein on the node 100.

Radiostream/radiogram component 202 may implement a TCP-like protocol that takes data, e.g. from an application 220 on node 100, sends the data across to a specific destination, attaches sequence numbers to data to make sure the data arrive in order, expects to get acknowledgement packets in return. Radiostream/radiogram component 202 implements a higher-level protocol that provides some reliability to the lower-level communications layer.

LowPAN component 204 handles the routing of packets. In one embodiment, LowPAN component 204 may include "hooks" or interfaces for implementing various route-related methods such as a method to find a route (e.g., FindRoute) and a method for invalidating a route (e.g., InvalidateRoute). LowPAN component 204 does not care how routes are actually determined. In embodiments of routing module 220, determination of routes, as well as the collection of link quality and node health metrics and calculations of the route selection metric, are performed by link and node monitor 212 and routing manager 210. Link and node monitor 212 handles the link quality and node health monitoring on node 100 by monitoring local resources such as battery life and by obtaining information from radio packet dispatcher component 206, specifically the link quality value of packets that have been received. Routing manager 210 implements routing methods such as a FindRoute and InvalidateRoute method to support the link quality and node health aware routing protocol. Routing manager 210 receives link quality and node health information from link and node monitor 212 and uses the information in calculating route metrics such as a route selection metric. Routing manager 210 may also be responsible for selecting a best route from a set of two or more candidate routes that each have a corresponding route selection metric calculated according to the link quality and node health aware routing protocol.

Link and node monitor 212 monitors information related to all of the other nodes from which node 100 receives packets. For any packet that passes through node 100, link and node monitor 212 extracts link quality information from the packet. In one embodiment, heartbeat messages may be exchanged among nodes that include node health information, e.g. battery life information. Link and node monitor 212 monitors neighbor nodes, because those nodes are how the immediate link (next hop) is determined. Routing messages (route request and route response messages) may include a cumulative link quality that is passed along. When a node creates a route response message, the route response message includes a link quality metric based on a calculation of the node's link to the next node weighted with previous values received from one or more nodes that the route response message has traversed. This calculation is performed by routing manager 210. Similarly, the route response message may include node health metric(s) calculated by routing manager 210. Thus, routing manager 210 may pass link quality and node health metrics calculated or determined for node 100 along to LowPAN component 204 for inclusion in outgoing packets.

Routing manager 210 and link and node monitor 212 implement the link quality and node battery health aware routing protocol in routing module 200 on nodes 100 in a network. Link and node monitor 212 monitors traffic in the neighborhood to estimate link quality with each neighbor, and also monitors node battery usage and/or other node health metrics. In one embodiment, a history depreciated normalized sum of the link quality over a time window may be used as a measure of link quality. In one embodiment, a normalized function of the residual node battery power may be used as a measure for the node health. In one embodiment, the current traffic through the node may be used as a measure of the node health. In one embodiment, both a normalized function of the residual node battery power and the current traffic through the node may be used to measure node health. Thus, the information passed along to other nodes by node 100 is not just a simple value of the link (e.g., the number of hops), but incorporates link quality information and node health information.

An exemplary formulation for calculating a routing cost metric C at node 100 that may be implemented in embodiments of routing manager 210 is further described below. Note that the link quality and node health metrics may be weighted, and also note that one or more parameters used in calculating C may be tunable. Weighting may be performed to adjust the effect of either link quality or node health, or both, in calculating C.

Link Quality ($L_{norm}$) and Node Energy Health ($N_H$) Formulation

The average Link Quality Indicator (LQI) values may be used to estimate the link quality with a given neighbor as the LQI values correlate well with the packet reception rate of the link. The link quality estimate may be based on a window mean exponentially weighted moving average (WMEWMA) of the LQI values with a neighbor in each time slot, with the time window being the duration τ of each time slot t. Thus, the normalized link quality update of a node may be given by:

$$L_{norm}(t+1) = \gamma L_{norm}(t) + (1-\gamma)\frac{L_{avg}(t)}{L_{max}} \quad (1)$$

where $L_{avg}(t)$ is the average of the LQI values of the packets in the current slot. The weight factor $\gamma \in [0,1]$ is the history weighing factor that decides the contribution of the previous estimate of the link quality. $L_{max}$ is the maximum LQI value (255) of a packet.

Similarly, $N_E$ may be calculated. $N_E$ is an average time for a node to deplete its energy. This may be referred to as the Mean Residual Battery Lifetime of the node. Let $e_t$ and $e_r$ denote the energy/bit (e.g., in nanojoules (nJ)) consumed for transmitting and receiving a packet, respectively. If the packet size is P bits, then energy consumed by a node for transmitting and receiving a packet is:

$$En_{tx} = P \cdot e_t \quad (2)$$

and the energy for reception is:

$$En_{rx} = P \cdot e_r \quad (3)$$

The same time window τ (as in the link quality computation) may be used for estimating the lifetime of a node. If $N_t$ and $N_r$ denote the count of the number of packets transmitted and received by a node in time window τ, respectively, then average energy consumption rate in the history window may be given by:

$$R_p = \frac{N_t \cdot En_{tx} + N_r \cdot En_{rx}}{\tau} \quad (4)$$

The maximum energy drain rate $R_{pmax}$ may now be computed. Let $D_r$ denote the maximum data rate (in bits per second) of the radio channel, which in the case of 802.15.4 is 250 kbps. Moreover, since reception consumes slightly more energy than transmission, $R_{pmax}$ may be denoted by:

$$R_{pmax} = D_r \cdot e_r \quad (5)$$

Thus, the normalized energy drain rate may be given by:

$$\frac{R_p}{R_{pmax}}$$

The residual energy preserving rate may be denoted by:

$$E_s = 1 - \frac{R_p}{R_{pmax}}$$

Let $E_{rem}$ denote the fractional battery power remaining. $E_{rem}$ may be given by:

$$E_{rem} = \frac{P_{rem}}{P_{max}} \quad (6)$$

where $P_{rem}$ is the remaining battery power and $P_{max}$ is the maximum battery power when fully charged. The node energy health metric may be denoted as $N_H$. This is the parameter that would be directly used to contribute to the routing cost. $N_H$ is not only dependent on the energy drain rate, which is the metric that captures the node activity or load in terms of energy usage for communication in a given history time window, but also on the remaining fractional battery power. Thus, $N_H$ may be given by:

$$N_H = E_s \cdot E_{rem} \quad (7)$$

An implicit assumption is that a node consumes the bulk of its energy in communication, and computation cost is negligible in comparison. This may not be valid in all situations such as when a node performs aggregation or when it is performing some complex cryptographic operation on a packet. However, for this analysis, it is assumed that a node does not perform any of those operations. If C denotes the routing cost metric at a node, C may be denoted by:

$$C = \frac{1}{\alpha \cdot L_{norm} + (1-\alpha) \cdot N_H} \quad (8)$$

Tunable parameters include τ, γ, and α, where τ and γ qualify the duration and importance factor of historical data, respectively, and α∈[0,1] is the weighing factor between the two cost variables.

In one embodiment, routing cost metric C may be a real number between 0 and 1, inclusive. Other embodiments may use other ranges for C. In one embodiment, a low value for C is indicative of high-quality link(s) at the node 100 and/or high node health at the node 100. In another embodiment, a high value for C may indicate a healthy node with good links. In one embodiment, the total hop count at the node 100 for a particular route may be adjusted according to routing cost metric C to generate the route selection metric at the node 100. In one embodiment, the total hop count may be multiplied by C at each node 100 to generate the route selection metric at the node 100. For example, if a low value for C is indicative of a healthy node with good links and the route selection metric is multiplied by C, a lower value of the route selection metric would indicate a more favorable path. On a route with a lot of hops, if every node generates a low C that indicates high quality, the route will have a low value for the route selection metric and thus may be equivalent to or better than a route with fewer hops if the C values on that route are higher. Other methods of adjusting the route selection metric with C may be used in some embodiments; for example, in some embodiments, a method may be used that produces higher values for the route selection metric that indicate preferable routes. In one embodiment, rather than multiplying to total hop count by C at each node 100 to generate the route selection metric at the node 100, the routing cost factor C at each node may be added to the routing message for each route that includes the node. At a source node that initiated the route request that generated the routing message, the source node may perform the calculations of the routing selection metrics for routes to the destination node from the number of hops and route node C values included in each received route reply message.

In one embodiment, a threshold may be used to exclude or further weight against routes that include one or more nodes whose C values indicate poor link quality and/or poor health. For example, if a low value for C is indicative of a healthy node with good links, and if C is a real number between 0 and 1 inclusive, a threshold of, for example, 0.8 may be applied. In one embodiment, if any node on the route has a C that exceeds the threshold, then that route may be marked as undesirable or unusable, or alternatively further weighting may be applied to the route selection metric for routes that include that node so that routes that include that node are less likely to be selected.

Figure 4:
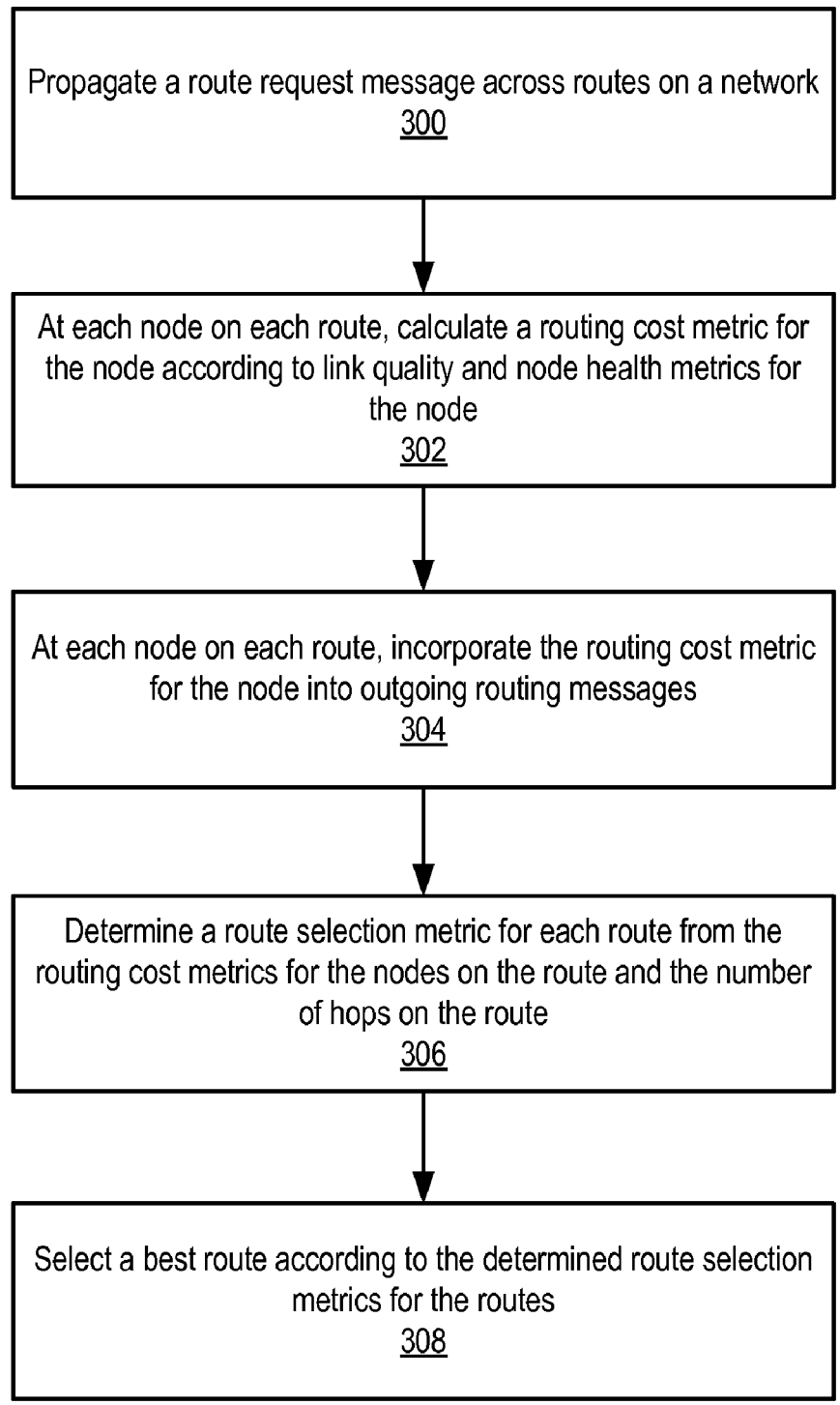
FIG. 4 is a flowchart of a method for implementing a link quality and node health aware routing protocol to select routes in a network according to one embodiment.

FIG. 4 is a flowchart of a method of implementing a link quality and node health aware routing protocol to select routes in a network according to one embodiment. As indicated at 300, a route request message may be propagated across routes on a network from a source node looking for a route to a destination node. As indicated at 302, at each node on each route, a routing cost metric for the node may be calculated according to link quality and node health metrics for the node. As indicated at 304, at each node on each route, the routing cost metric for the node may be incorporated into outgoing routing messages (e.g., route replies). As indicated at 306, a route selection metric for each route may be determined from the routing cost metrics for the nodes on the route and the number of hops on the route. In one embodiment, calculation of the route selection metrics for the routes may be performed at the source node upon receiving route replies that include the number of hops on the corresponding routes and the routing cost metrics for the nodes on the routes. In another embodiment, the route selection metrics for the routes may be calculated or adjusted at nodes along each route, rather than calculating the route selection metrics for all routes entirely at the source node. In one embodiment, the source node may consider local link quality information known by the source node in the calculation of the routing selection metrics for the routes. As indicated at 308, the source node may then select a best route according to the determined route selection metrics for the routes. In one embodiment, other routes not selected may be discarded. Alternatively, in one embodiment, the source node may store one or more other routes that may be used as alternate or replacement routes if the selected route goes down or the quality of communications on the route goes down to an unacceptable level.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A device, comprising:
   a processor; and
   a memory comprising program instructions executable by the processor to implement a routing module configured to:
      determine one or more link quality metrics and one or more health metrics at the device, wherein the one or more link quality metrics indicate communications link quality to one or more other devices that are neighbor nodes to the device on a network, and wherein the one or more health metrics indicate current health status of the device;
      determine a routing cost metric for the device from the one or more link quality metrics and the one or more health metrics;
      receive a routing message corresponding to a particular route on the network that includes the device from a previous node on the particular route;
      in response to receiving the routing message, include the routing cost metric for the device in the routing message; and
      send the routing message to a next node on the particular route.

2. The device as recited in claim 1, wherein the routing cost metric included in the outgoing routing message is used in calculating a routing selection metric for the particular route on the network, wherein the routing selection metric for the particular route is compared to the routing selection metric for other routes on the network at a source node of the routing message to select a best route on the network from the source node to a destination node on the network.

3. The device as recited in claim 1, wherein the network is a wireless network, wherein the device further comprises a wireless communications module, and wherein the device configured to communicate with other devices on the wireless network via the wireless communications module.

4. The device as recited in claim 1, wherein the device further comprises a limited power source, and wherein the one or more health metrics include current status of the limited power source.

5. The device as recited in claim 1, wherein the device further comprises a battery as a power source, and wherein the one or more health metrics include a health metric determined by the routing module according to a normalized function of power remaining in the battery.

6. The device as recited in claim 1, wherein the one or more link quality metrics include a link quality metric determined by the routing module as a history depreciated normalized sum of link quality at the device over a time window.

7. A system, comprising:
   a plurality of nodes configured to implement a network among the nodes, wherein each node is a computing device that implements a routing module configured to:
      determine one or more link quality metrics and one or more health metrics at the node, wherein the one or more link quality metrics indicate communications link quality to one or more other nodes that are neighbor nodes to the node on the network, and wherein the one or more health metrics indicate current health status of the device;
      determine a routing cost metric for the node from the one or more link quality metrics and the one or more health metrics;
      receive one or more routing messages each corresponding to a particular route on the network that includes the node from a previous node on the particular route;
      in response to receiving the one or more routing messages, include the routing cost metric for the node into each of the one or more routing messages; and
      send each of the one or more routing message to a next node on the corresponding particular route.

8. The system as recited in claim 7, wherein one of the plurality of nodes is a source node configured to:
   initiate a route request message on the network, wherein the route request message requests route information to one of the plurality of nodes as a destination node;
   calculate a routing selection metric for each particular route on the network to the destination node according to the routing cost metrics included in route reply messages received at the source node; and
   compare the calculated routing selection metrics for the routes on the network to the destination node to select a best route to the destination node.

9. The system as recited in claim 8, wherein, to calculate a routing selection metric for each particular route on the network to the destination node according to the routing cost metrics included in route reply messages received at the source node, the source node is further configured to, for each route reply message, adjust a count of the number of hops on a route indicated in the route reply message according to routing cost metrics for nodes on the route indicated by the route reply message.

10. The system as recited in claim 7, wherein the nodes are wireless devices, wherein the network is a wireless network, and wherein each node is configured to communicate with other nodes on the wireless network via a wireless communications protocol.

11. The system as recited in claim 7, wherein one or more of the devices comprises a limited power source, and wherein the one or more health metrics include current status of the limited power source.

12. A method, comprising:
- initiating, at a source node on a network implemented among a plurality of nodes, a route request message that requests route information to a destination node on the network;
- propagating the route request message across a plurality of routes through the nodes on the network to the destination node;
- initiating, at the destination node, a route reply message for each route request message received at the destination node;
- calculating a routing cost metric from one or more link quality metrics and one or more health metrics at each node on each route; and
- including, at the each node on each route, the routing cost metric for the node on a particular route in a route reply message corresponding to the particular route on the network that includes the node.

13. The method as recited in claim 12, wherein the one or more link quality metrics indicate communications link quality to one or more other nodes that are neighbor nodes to the node on the network, and wherein the one or more health metrics indicate current health status of the node.

14. The method as recited in claim 13, wherein one or more of the nodes comprises a limited power source, and wherein the one or more health metrics include current status of the limited power source.

15. The method as recited in claim 12, further comprising:
- calculating a routing selection metric for each particular route on the network to the destination node according to the routing cost metrics included in the route reply messages; and
- comparing, at the source node, the calculated routing selection metrics for the routes on the network to the destination node to select a best route to the destination node.

16. The method as recited in claim 14, wherein said calculating a routing selection metric for each particular route on the network to the destination node according to the routing cost metrics included in the route reply messages comprises, for each route reply message, adjusting a count of the number of hops on a route indicated in the route reply message according to routing cost metrics for nodes on the route indicated by the route reply message.

17. The method as recited in claim 12, wherein the nodes are wireless devices, wherein the network is a wireless network, and wherein each node is configured to communicate with other nodes on the wireless network via a wireless communications protocol.

* * * * *